United States Patent [19]

Yamazaki et al.

[11] Patent Number: 5,319,476

[45] Date of Patent: Jun. 7, 1994

[54] MULTIPLY RECORDED HOLOGRAM FOR SECURITY

[75] Inventors: Satoshi Yamazaki; Shigehiko Tahara, both of Tokyo, Japan

[73] Assignee: Dai Nippon Printing Co., Ltd., Tokyo, Japan

[21] Appl. No.: 2,200

[22] Filed: Jan. 8, 1993

[30] Foreign Application Priority Data

Jan. 10, 1992 [JP] Japan ................... 4-002884

[51] Int. Cl.5 .................. G03H 1/28; G06K 7/10
[52] U.S. Cl. ................................. 359/2; 283/86; 283/904; 356/71; 359/24
[58] Field of Search ............ 359/2, 22, 24; 356/71; 283/86, 904

[56] References Cited

U.S. PATENT DOCUMENTS

| | | | |
|---|---|---|---|
| 3,643,216 | 2/1972 | Greenaway et al. | 356/71 |
| 4,120,559 | 10/1978 | Abramson et al. | 359/2 |
| 4,171,766 | 10/1979 | Ruell | 359/2 |
| 4,235,505 | 11/1980 | Hariharan et al. | 359/24 |
| 4,250,393 | 2/1981 | Greenaway | 356/71 |
| 4,501,439 | 2/1985 | Antes | 356/71 |
| 4,524,276 | 6/1985 | Ohtombe | 356/71 |
| 4,563,024 | 1/1986 | Blyth | 359/2 |
| 4,820,006 | 4/1989 | Constant | 359/2 |
| 5,128,780 | 7/1992 | Smith | 359/24 |

*Primary Examiner*—Martin Lerner
*Attorney, Agent, or Firm*—Dellett and Walters

[57] ABSTRACT

A hologram containing information recorded such a manner that it is difficult to read. A Lippmann hologram (10) contains photoelectrically readable information (13) recorded so as to be reconstructible only with a specific invisible wavelength (6) in the infrared or ultraviolet region. It is difficult to read the information recorded on the hologram unless information about the wavelength of diffracted light (14) for reconstruction is given. The hologram is also difficult to forge and hence suitable for security purposes.

3 Claims, 1 Drawing Sheet

MULTIPLY RECORDED HOLOGRAM FOR SECURITY

BACKGROUND OF THE INVENTION

The present invention relates to a hologram and, more particularly, to a Lippmann hologram which is reconstructible only with infrared or ultraviolet rays and hence suitable for security purposes.

It is a known practice to provide a hologram, which contains the record of a three-dimensional image symbol, pattern, etc., on a card or a bankbook, for example, as an integral part thereof in order to guarantee that the card or bankbook is genuine and it is not a forgery, and to reconstruct the hologram by illumination with specific reconstructing light to thereby verify that the card or bankbook is genuine.

However, most holograms used for such security purposes are simple diffraction grating patterns, image holograms, or Fresnel holograms. Therefore, these holograms can be readily reconstructed and read with simple illuminating light for reconstruction, and it is not always difficult to read and forge them.

SUMMARY OF THE INVENTION

In view of these circumstances, it is an object of the present invention to provide a hologram which is designed so that information recorded thereon is difficult to read.

To attain the above-described object, the present invention provides a Lippmann hologram containing photoelectrically readable information recorded so as to be reconstructible only with a specific invisible wavelength in the infrared or ultraviolet region.

The hologram may contain at least one other pattern information which is multiple-recorded so as to be reconstructible with a wavelength different from the specific invisible wavelength. The second wavelength, which is different from the specific invisible wavelength, may include a visible wavelength. The hologram may be provided on a part or the whole of a card for prevention of forgery.

According to the present invention, the hologram contains information which is recorded so as to be reconstructible only with a specific invisible wavelength in the infrared or ultraviolet region. Therefore, it is difficult to read the information recorded on the hologram unless information about the reconstructing wavelength is given. It is also difficult to forge the hologram. Accordingly, the hologram is suitable for security purposes.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

DESCRIPTION OF THE PREFERRED EMBODIMENTS

Embodiments of the hologram according to the present invention will be described below with reference to the accompanying drawings.

When a hologram is used for security purposes and arranged so as to be read photoelectrically, it is desirable that information recorded on the hologram should be difficult to read. The hologram of the present invention is basically designed to be reconstructible only with invisible light by making use of the reconstruction wavelength selection properties of Lippmann hologram, so that recorded information can be read only by illuminating the hologram with reconstructing light including a specific wavelength, and detecting this specific wavelength.

Figure 1:
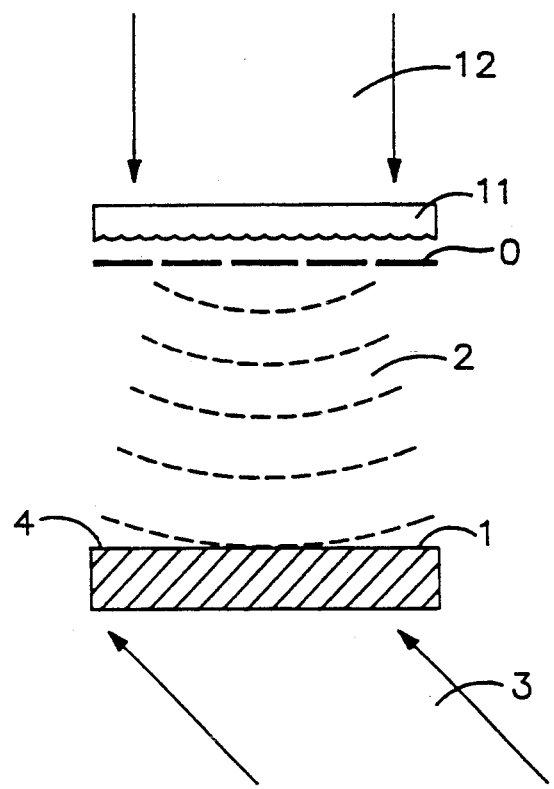
FIG. 1 shows the arrangement of an optical system for recording a Lippmann hologram.

First, Lippmann hologram will be explained. Lippmann hologram is a kind of volume hologram. As shown in FIG. 1, illuminating light 12 is applied to an object (e.g., a pattern mask) O through a diffuser 11 to generate an object wave 2 containing information on the object O. The object wave 2 is made incident on the obverse surface of a thick photosensitive material 1, while a reference wave 3 is made incident on the reverse surface of the photosensitive material 1, thereby generating a standing wave inside the photosensitive material 1 by the two wavefronts, and thus forming three-dimensional interference fringes 4, which are recorded by the refractive index distribution or the like. If reconstruction illuminating light of the same wavelength as that of the reference wave is made incident on the hologram in the same direction as the direction of incidence of the reference light, a virtual image of the object O is reconstructed, whereas, if the same illuminating light is made incident on the hologram in the direction opposite to the direction of incidence of the reference light, a real image of the object O is reconstructed. If the Lippmann hologram is illuminated with white light, the object wave of the original wavelength can be reconstructed by virtue of the wavelength selection properties. In addition, the Lippmann hologram enables multiple recording in the same way as in the case of other holograms.

Figure 2:
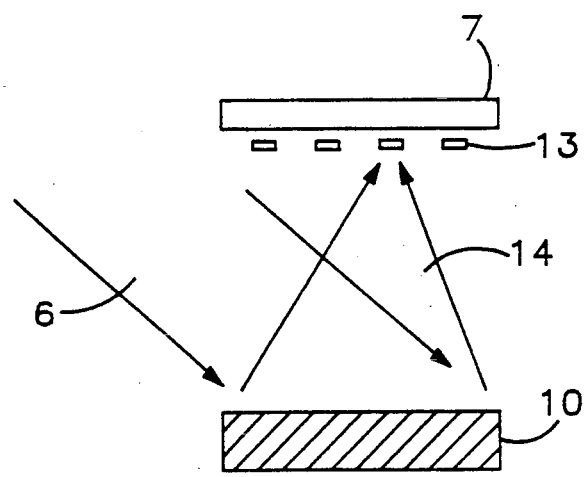
FIG. 2 shows one example of an arrangement for reading recorded information from a Lippmann hologram.

Incidentally, in the present invention, a machine-readable pattern O, for example, a bar code pattern, is recorded as a Lippmann hologram with the arrangement such as that shown in FIG. 1 by using either infrared or ultraviolet rays so that the pattern O cannot be read with visible light. With this hologram, no recorded information can be seen with visible light, but the recorded pattern O is reconstructed and becomes machine-readable only when the hologram is illuminated by a light source containing infrared or ultraviolet rays of a predetermined wavelength. FIG. 2 shows one example of an arrangement for reading recorded information from a Lippmann hologram 10 formed as described above. The Lippmann hologram 10 is illuminated with light containing infrared or ultraviolet rays 6 of a predetermined wavelength from a direction opposite to the direction of incident of the reference light applied at the time of recording the hologram 10. The reconstructed wavefront 14 forms an image of the recorded pattern 13 at a position corresponding to the object position at the time of the recording. Therefore, if a reading element 7, e.g., a CCD, is disposed where an image of the recorded pattern 13 is formed, the recorded pattern 13, e.g., a bar code pattern for prevention of forgery, can be read with the reading element 7. If a half-mirror is disposed in between the Lippmann hologram 10 and the position where an image of the recorded pattern 13 is formed, the size of the reading device can be reduced. The Lippmann hologram containing the record of information for security, which is reconstructible only with invisible light, may be attached integrally to a part of an article, for example, a card, or a bankbook, for preventing forgery of the article.

Although in the foregoing embodiment the Lippmann hologram 10 contains only the record of information which is readable only with infrared or ultraviolet rays of a specific wavelength, another information can be additionally recorded thereon so that this information can be reconstructed with light of different wavelength. For example, information which is reconstructible with visible light may be recorded as a Lippmann hologram by multiple recording. In such a case, a person who looks at the hologram is deceived by an image reconstructed by visible light, and it is difficult for him or her to perceive that information for security has been recorded with an invisible wavelength. Accordingly, the degree of security improves. It is also possible to judge whether the hologram is genuine or a forgery by a visual observation. In addition, a decorative effect is provided.

A Lippmann hologram which is reconstructible only with ultraviolet rays or infrared rays can be produced by using a photosensitive material that is sensitive to ultraviolet rays or infrared rays, respectively. However, it is also possible to produce a Lippmann hologram which is reconstructible with a wavelength different from the wavelength of light used for the recording by making the thickness of the photosensitive material of the hologram after recording different from that during the recording. Specifically, this can be realized by swelling or contracting the photosensitive material after the recording. If the thickness of the photosensitive material after the recording becomes greater than that during the recording, a Lippmann hologram which is reconstructible with a wavelength longer than the recording wavelength is obtained, whereas, if the thickness of the photosensitive material becomes smaller than that during the recording, a Lippmann hologram which is reconstructible with a wavelength shorter than the recording wavelength is obtained. Accordingly, it is possible to obtain a Lippmann hologram which is recorded with visible light and reconstructed with ultraviolet or infrared light.

Although the hologram of the present invention has been described by way of embodiments, it should be noted that the present invention is not necessarily limited to these embodiments and that various changes and modifications may be imparted thereto. In addition, any kind of information may be recorded on the hologram, for example, information used to judge whether a card or other article is genuine or a forgery. The hologram of the present invention may be provided on a credit card, prepaid card, commuter pass, bankbook, passport, etc. for making judgment as to whether it is genuine or a forgery.

As will be clear from the foregoing description, the hologram of the present invention contains the record of information which is reconstructible only with a specific invisible wavelength in the infrared or ultraviolet region. Therefore, it is difficult to read the information recorded on the hologram unless information about the reconstructing wavelength is given. It is also difficult to forge the hologram. Accordingly, the hologram of the present invention is suitable for security purposes.

What we claim is:

1. A hologram multiply recorded for security said hologram comprising:
   photoelectrically readable security information recorded as a Lippman hologram so as to be reconstructible only with a specific invisible wavelength in an infrared or ultraviolet region; and
   at least one other pattern information multiply recorded as a Lippman hologram in an overlapping relationship with said security information and being reconstructible with light of a wavelength different from said specific invisible wavelength, thereby making the presence and determination of said security information difficult without knowing said specific invisible wavelength.

2. A hologram according to claim 1, wherein said wavelength associated with said at least one other pattern information, which is different from said specific invisible wavelength, includes a visible wavelength.

3. A hologram according to claims 1 or 2, which is provided on a part or the whole of a card.

* * * * *